US005531179A

United States Patent [19]
Roycroft et al.

[11] Patent Number: 5,531,179
[45] Date of Patent: Jul. 2, 1996

[54] WHEEL-RETRACTION APPARATUS AND METHOD FOR AMPHIBIOUS VEHICLE

[76] Inventors: Terence J. Roycroft; Marie A. Roycroft, both of Manukau Heads Road, Waiuku R.D. 4, New Zealand

[21] Appl. No.: 385,644

[22] Filed: Feb. 8, 1995

[30]     Foreign Application Priority Data

Feb. 25, 1994 [NZ]   New Zealand ............................ 250979

[51] Int. Cl.⁶ ..................................................... B63B 35/00
[52] U.S. Cl. ........................................... 114/270; 114/344
[58] Field of Search .................................... 114/270, 344

[56]             References Cited

U.S. PATENT DOCUMENTS 4,958,584   9/1990   Williamson ............................. 114/270

FOREIGN PATENT DOCUMENTS 408328   1/1925   Germany ............................... 114/270

Primary Examiner—Jesus D. Sotelo
Attorney, Agent, or Firm—Murray John Service

[57]              ABSTRACT

An apparatus for retracting axle-driven wheels onboard an amphibious vehicle provides a retracting process by which the wheels of the vehicle may be moved from a land-support position, to a water-borne position wherein the wheels are substantially above the waterline of the vehicle when afloat. The wheels are axle-driven, with pivotable connections allowing the axles to guide the retracting process; steering connections are pivotably able to follow the process, and steering motion is self-cancelling in the retracted mode. Suitable compartments enclose and support the apparatus in all positions, and seals are provided at the axles to prevent water entering the vehicle interior. A variety of devices may be employed to actuate the apparatus, and also to provide suspension to the vehicle on land.

12 Claims, 5 Drawing Sheets

1  2 42 14 16   3P  13        36 5  3R 10 3P   43 7 6B 4  8 9

1  2  44 42  3P  10 7 6A  26  14    5 16 43 3R 6B 7  4  8 9

1 2 3R 13 14 10  7   6B 11 10 12 16 3P 14 43 13

WHEEL-RETRACTION APPARATUS AND METHOD FOR AMPHIBIOUS VEHICLE

BACKGROUND OF THE INVENTION

1. Field of the Invention

This invention relates to an amphibious vehicle, and particularly, an apparatus and method for retracting axle-driven wheels onboard such vehicle.

2. Description of Prior Art

Numerous amphibious vehicles have been designed and manufactured; the majority of these leave the wheels in place when the vehicle is water-borne, thereby limiting the speed of the vehicle through water.

U.S. Pat. No. 3,903,831 describes a vehicle having a retractable wheel-system to retract the wheels into cavities within the hull of the craft. This mechanism does not draw the wheels to a position fully above the waterline when afloat, but instead uses a complex mechanism to pivot the wheels to within the hull and to close a hatch over the opening of the wheel-cavities to reduce drag in the water. The pivoting apparatus of this design also of necessity requires chains as the drive-means; such chains require a higher degree of attention and maintenance than more dependable drive-axles, especially in the marine environment.

U.S. Pat. No. 4,958,584 discloses a pivoting mechanism which raises the wheels to a limited height where sliding panels may be employed to cover the openings into the hull. Again, the wheels are not raised above the waterline of the craft when afloat, and extra components and mechanisms are necessary to close the wheel-cavities in order to overcome the drag of the wheels in the water.

Consequently the need exists for an improved apparatus which will retract axle-driven wheels onboard an amphibious vehicle whereby they do not directly contact water while the vehicle is normally afloat, without need for covers or sliding panels to render them unobtrusive.

Accordingly it is the object of this invention to overcome the disadvantages of the prior art, or at least provide the public with a useful choice.

SUMMARY OF THE INVENTION

In a broad aspect, the invention may be said to consist in an amphibious vehicle intended for land and water service, comprising: a body, being a buoyant vessel, containing a motor, this being driveably connected to drive outputs, these connected to preferably four wheels, these being located to the body so as to be retractable above the waterline.

In a more particular aspect the invention provides the amphibious vehicle with an apparatus and method having drive connections for driveably and pivotally connecting a drive output to at least one wheel while allowing the wheel to follow a retracting process from a protracted position (wherein the wheel has an axis of rotation substantially horizontal and is able to provide land support to the vehicle), to a retracted position (wherein the wheel has the axis at an angle greater than 45 degrees to the horizontal and is elevated substantially above the waterline of the vehicle when afloat).

The invention further provides a location system for locating the wheel relative to the body of the vehicle, and for providing a geometric arrangement whereby the wheel may follow the retracting process while remaining connected to the drive connections.

The invention further provides vehicular steering to at least a front wheel by means of steering connections which may remain connected to the wheel throughout the retracting process, and which are so arranged that steering motion of the wheel will be cancelled when the wheel is in the retracted position.

The invention further provides suitable compartments (integral with the body) which, firstly: enclose the apparatus, secondly: support the apparatus, thirdly: largely enclose the wheel in the retracted position and, fourthly: provide sealing to prevent water passing inboard the vehicle.

The invention further provides a device for actuating the retracting process, this device also providing suspensional support for the vehicle on land.

DESCRIPTION OF THE PREFERRED EMBODIMENTS

Figure 1A:
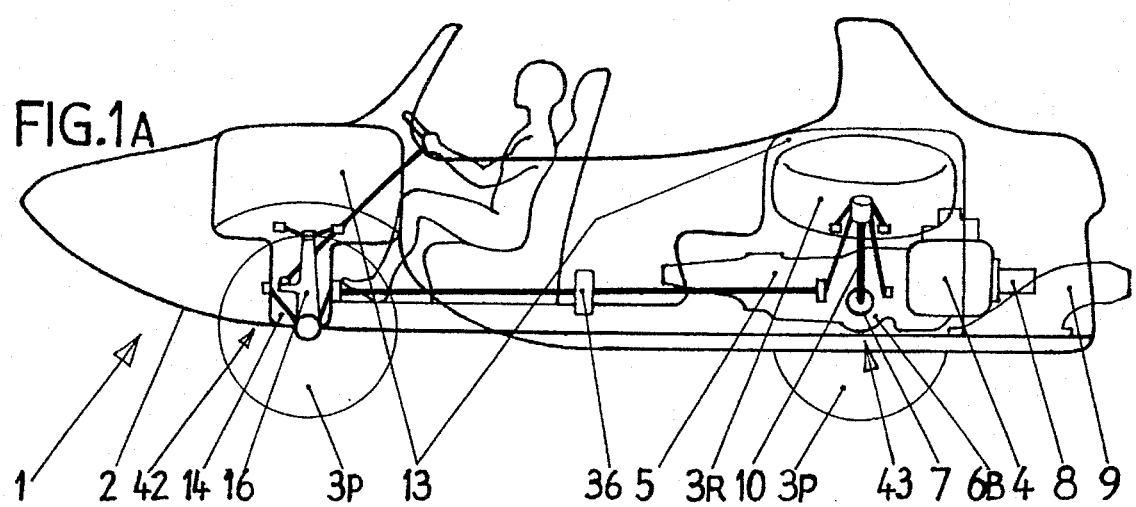
FIGS. 1A, 1B and 1C are respectively a side elevation, a plan view, and a rear elevation of one embodiment of the invention being the amphibious vehicle in a broad aspect.
Figure 1B:
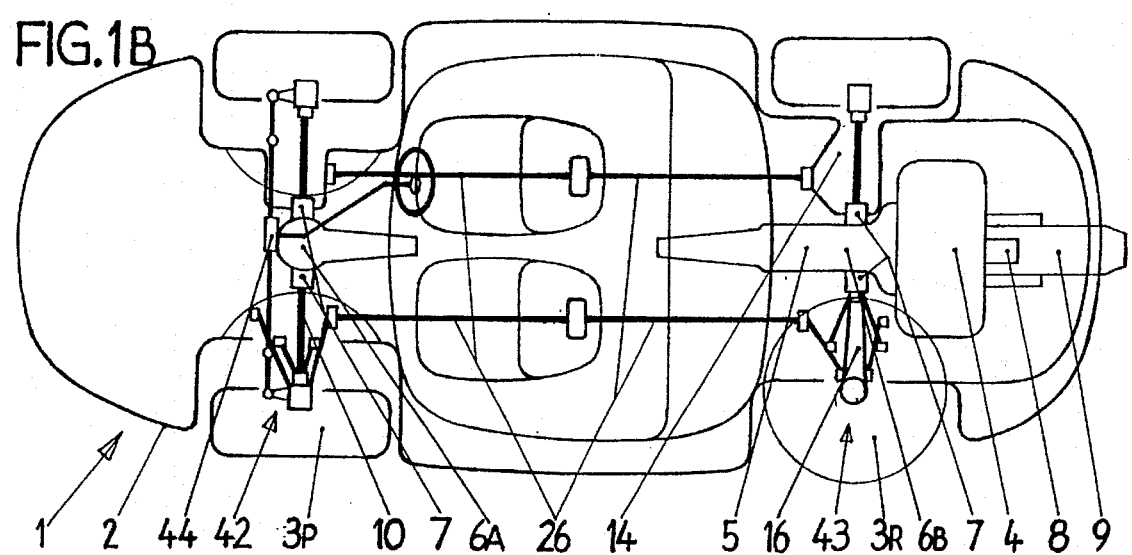
Figure 1C:
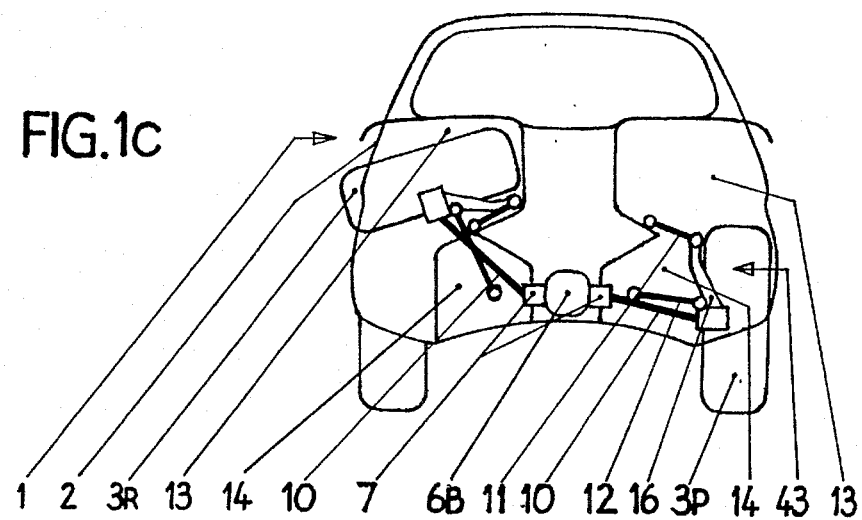

Referring to the drawings: FIGS. 1A, 1B and 1C show three views of an amphibious vehicle (generally indicated by arrow 1) comprising a body 2 being a buoyant vessel, having wheels 3 (indicated by 3P for the protracted position, and 3R for the retracted position). As shown, this preferred embodiment has four wheels; however, other configurations, such as three wheels, or multiple wheels, are possible.

The vehicle includes a motor 4 or similar power-source to provide power through transmission 5 to differentials 6A (front) and 6B (rear), each having drive-outputs 7, as shown. The motor 4 also provides power through a gearbox 8 to a marine propulsion unit 9. Various combinations of motors, transmissions and propulsion units can be assembled however, without change to the principle of the invention. The essential functions of this apparatus would be suited to numerous configurations of land-water amphibious vehicles. A wheel-retraction apparatus according to the present invention, is generally indicated by arrow 42 for steerable wheels and 43 for non-steerable wheels.

In this preferred embodiment, FIGS. 1A, 1B and 1C further show the drive-outputs 7 connected to the drive-axles 10, these being connected to the wheels 3P and 3R respectively, which are located to the body 2 (at front and rear) by upper suspension linkages 11, and lower suspension linkages 12. These axles and linkages operate in an upper compartment 13 and a lower compartment 14 for each of the wheels. From the three views of FIG. 1 it will be understood that each wheel may process from a lower (protracted) land-support position 3P to an upper (retracted) water-borne position 3R, wherein each wheel is largely enclosed within its respective upper compartment 13.

Figure 2:
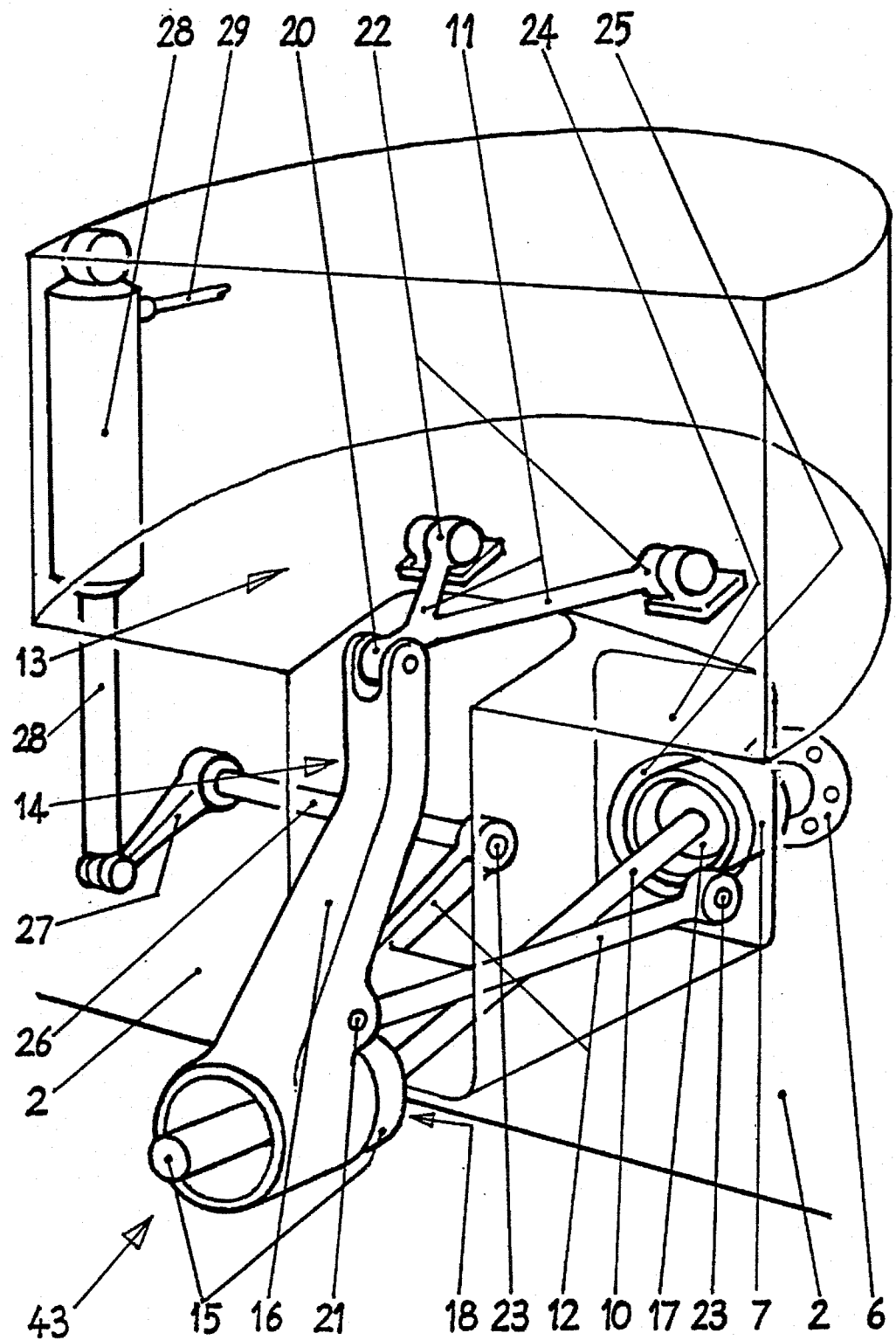
FIG. 2 is a perspective view of one embodiment of the invention being the wheel-retraction apparatus in the protracted position.

FIG. 2 shows, in perspective, an example of the apparatus 43 as arranged for a non-steerable wheel. The drive-output 7 from the differential 6, contains a driveable and pivotable inboard axle-joint 17 (being a constant-velocity joint in this example) connected to the proximate end of the drive-axle 10.

The distal end of the drive-axle 10 is connected to a proximate end of a spindle 15 by a driveable and pivotable outboard axle-joint 18 (similar to the inboard axle joint 17); the spindle 15 is borne rotatably on bearings housed within a lower end of a wheel-support member 16, and the wheel 3 (not shown in FIG. 2) is mounted conventionally on a distal end of the spindle 15.

By these drive connections a pivotable drive-line is formed from the drive-output 7 to the wheel 3 whereby the wheel 3 may follow the retracting process as determined by the drive-axle 10 articulating about the inboard axle-joint 17, and the spindle 15 articulating about the outboard axle joint 18.

The wheel 3 is thus rotatably mounted on the wheel-support member 16. An upper suspension linkage 11 is connected to the wheel-support member 16 at the upper outboard pivot 20, and is connected to the body 2 at upper inboard pivots 22. A lower suspension linkage 12 is connected to the wheel support member 16 at a lower outboard pivot 21, and is connected to the body 2 at lower inboard pivots 23. (In this example, the lower outboard pivot 21 takes the form of a hinge which prevents the rotation of the wheel-support member 16 about a vertical axis, thus prohibiting steerability) The location-system, such as suspension linkages 11 and 12 respectively, locates the wheel-support member 16 to the body 2 while allowing spring-movement for suspensional support when in the protracted position. The location-system also provides a geometric arrangement whereby the wheel-support member 16 may follow the retracting process, as detailed in FIG. 4.

In the embodiment of FIG. 2 the location-system is shown as double linkages, each forming a triangle with the body 2, but alternative linkages such as single or multiple members may be employed. Further alternative location-systems such as sliding members or reciprocating shafts, or any other suitable location-system, may also be employed to provide a similar geometric arrangement whereby the wheel-support member 16 (and thus the wheel 3) may follow the retracting process as determined by the drive connections.

FIG. 2 also shows the compartments 13 and 14 (integral with the body 2), which provide support and enclosure for the wheel retraction apparatus 43. The upper compartment 13 (having an open outboard end and a closed inboard end) provides support for the upper inboard pivots 22 and largely encloses the wheel 3 in the retracted position. The lower compartment 14 (having an open outboard end and a closed inboard end) encloses the lower suspension linkage 12 and the drive-axle 10, and supports the lower inboard pivots 23. Both compartments 13 and 14, and body 2, are depicted as if transparent in order to reveal the apparatus 43.

A bulkhead 24, which forms the closed inboard end of the lower compartment 14, has an opening, a portal 25, through which the drive-axle 10 may pass. The compartment 14, having an open outboard end, will be flooded when the vehicle 1 is afloat, and accordingly a sealing device is provided at the portal 25 to prevent water passing inboard the body 2.

FIG. 2 also shows one device for actuating the retracting process. One lower inboard pivot 23 (being supported by the compartment 14) is connected to a distal end of a torsion-bar 26 which may be of any convenient length. A proximate end of the torsion-bar 26 is connected to a lever 27 which is further connected to a power-device 28 (in this case a compressed-fluid cylinder) which applies torque to the torsion-bar 26 when driven by liquid or gas pressure (or combination thereof) from an input-pipe 29. This arrangement both applies actuating motion to the apparatus 43, and provides suspensional support to the vehicle 1. (Suspensional support is here defined as vehicular suspension on wheels having normal automotive spring-movement).

Alternatively, torsional flexibility in the torsion-bar 26 may be partly or wholly responsible for suspensional support.

Moreover, a power-device such as the power-device 28 may be connected directly or indirectly to the any part of the location-system, whereby the power-device 28 provides both actuating motion and suspensional support.

Figure 3:
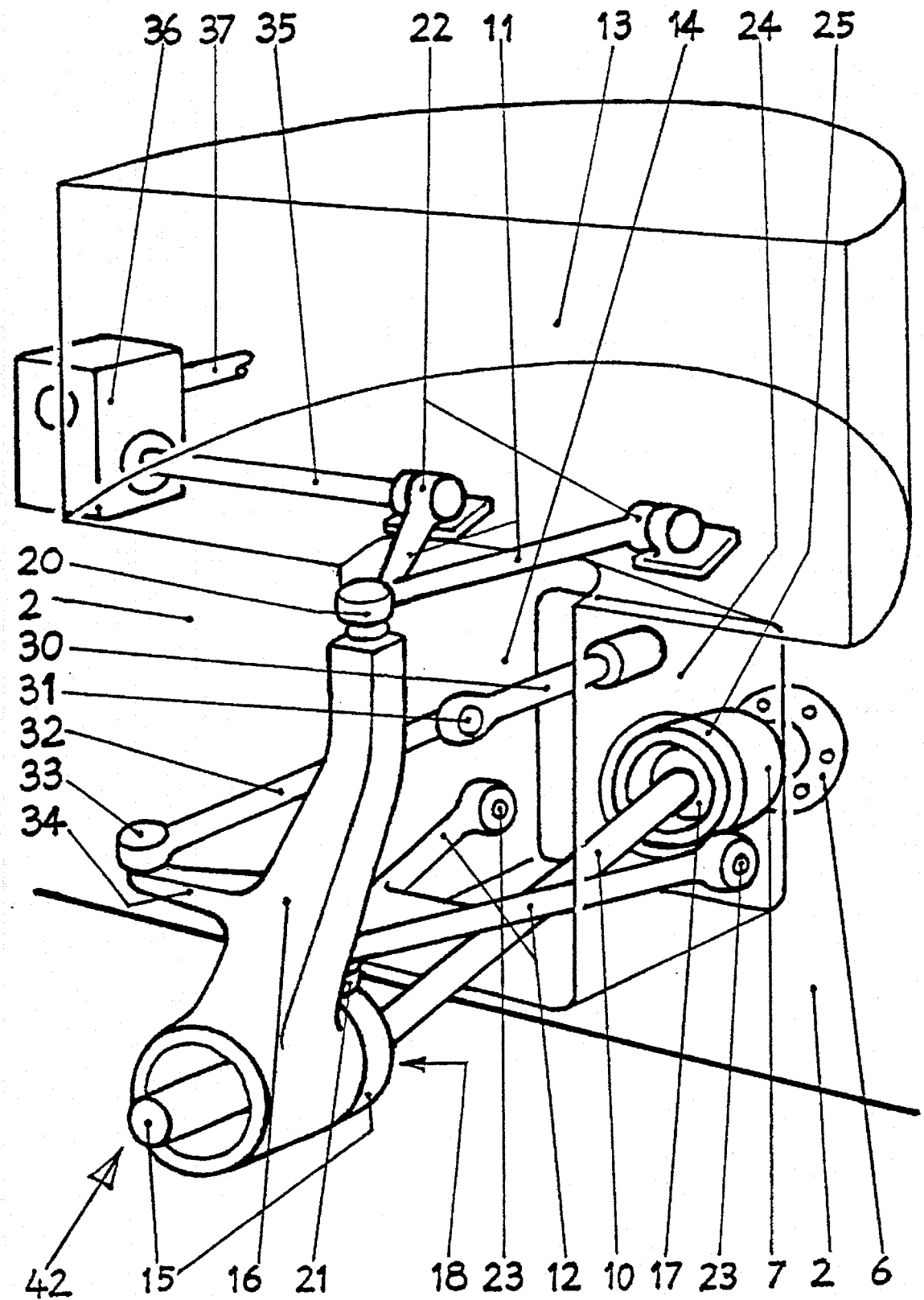
FIG. 3 is a perspective view of one embodiment of the invention being the apparatus of FIG. 2 with modifications for steering.

FIG. 3 shows, in perspective, an example of the wheel retraction apparatus 42 arranged for a steerable wheel; again the body and compartments are depicted as if transparent. It will be seen that the main components are similar to those of the non-steerable apparatus 43 of FIG. 2, and that suspension and location will function in the same way. Components having a similar function to those of the apparatus 43 are thus denoted with the same numerals, and description is omitted.

Steering pivots to provide vehicular steering include: the upper outboard pivot 20 being a multi-axis joint; and the lower outboard pivot 21 being a multi-axis joint: These steering pivots define a substantially vertical axis on which the wheel support member 16 may turn, thereby providing conventional vehicular steering to the wheel 3. In this example, vehicular steering is controlled by a steering-shaft 30, this having a linear reciprocating motion as supplied by a conventional automotive steering rack and pinion 44 (shown in FIG 1B). The steering-shaft 30 is connected to a steering-link 32 by a pivot 31; the steering-link 32 is connected to a steering-arm 34 by a pivot 33, while the steering arm 34 is fixed as a cantilever to the wheel -support member 16. These steering connections convert linear motion of the steering-shaft 30 to turning motion of the wheel-support member 16, while permitting movement of the wheel-support member 16 for suspensional support and the retracting process. Various arrangements of steering apparatus may be employed to provide steering motion, but in all cases the pivot 31, or equivalent, must be correctly positioned relative to the apparatus 42 whereby the steering-link 32 may articulate in substantially the same relationship to the retracting process. This process is detailed in FIG. 5.

FIG. 3 also discloses a further device for actuating the retracting process. A torsion-bar 35 is connected to one upper inboard pivot 22 (as for the torsion-bar 26 in FIG. 2); and a power-device 36, in this case a mechanical reduction-gear, applies torque to the torsion-bar 35 when driven by an input-shaft 37. This device for actuating, and that of FIG. 2, can be applied to the upper or lower inboard pivots 22 or 23 respectively, on either side of the apparatus 42 and 43 where convenient, whereby actuating motion and suspensional support are provided. Alternative power-devices of any suitable type may also be used.

Figure 4:
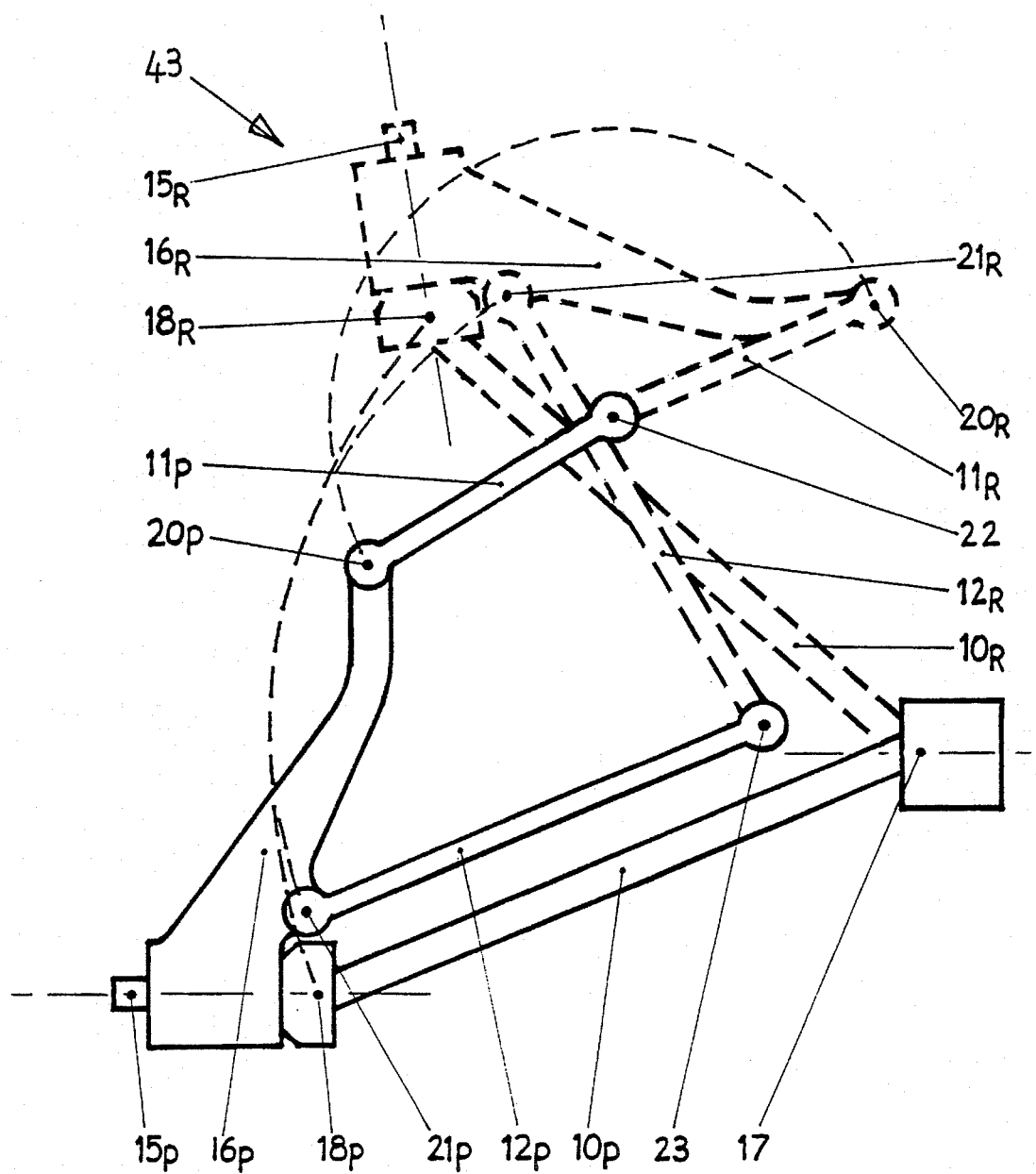
FIG. 4 is an end-elevational diagram of the apparatus of FIG. 2 shown in both the protracted position, and the retracted position.

FIG. 4 discloses the geometric arrangement of the retracting process of the apparatus 43 (non-steerable) in end elevation. Component numbers are suffixed P when the apparatus 43 is in the protracted position; component numbers are suffixed R when the apparatus 43 is in the retracted position.

In the course of the retracting process:

(a) the drive-axle 10P articulates to 10R about the inboard axle-joint 17, whereby the outboard axle-joint 18P describes an arc to 18R, (b) the lower suspension linkage 12P articulates to 12R about the lower inboard pivot 23, whereby the lower outboard pivot 21P describes an arc to 21R;

(c) the upper suspension-linkage 11P articulates to 11R about the upper inboard pivot 22, whereby the upper outboard pivot 20P describes an arc to 20R;

(d) whereby the wheel-support member 16P is caused to articulate about the inboard axle joint 17 and the outboard axle-joint 18P (18R) to arrive at the retracted position 16R, and the spindle 15P articulates to 15R about the outboard axle-joint 18P (18R).

Now referring to FIG. 4 and FIG. 5: the wheel-support member 16P in the protracted position provides a substantially horizontal centerline for the spindle 15P and a lower position relative to the body 2 whereby the wheel 3P may rotate on a substantially horizontal axis and protrude below the body 2 to provide land-support for the vehicle 1. The wheel-support member 16R in the retracted position provides a more vertically inclined centerline for the spindle 15R and a higher position relative to the body 2, whereby the wheel 3R is positioned substantially above the waterline and largely enclosed by the compartment 13.

The angle of spindle 15R when retracted may vary from 45 degrees to the horizontal (the minimum to achieve a useful height above the waterline) to a full 90 degrees or further if found suitable, this being limited only by the axle joints, which commonly allow over 45 degrees articulation each. For this particular vehicle, an angle of 80 degrees from the horizontal has been found optimal.

Figure 5:
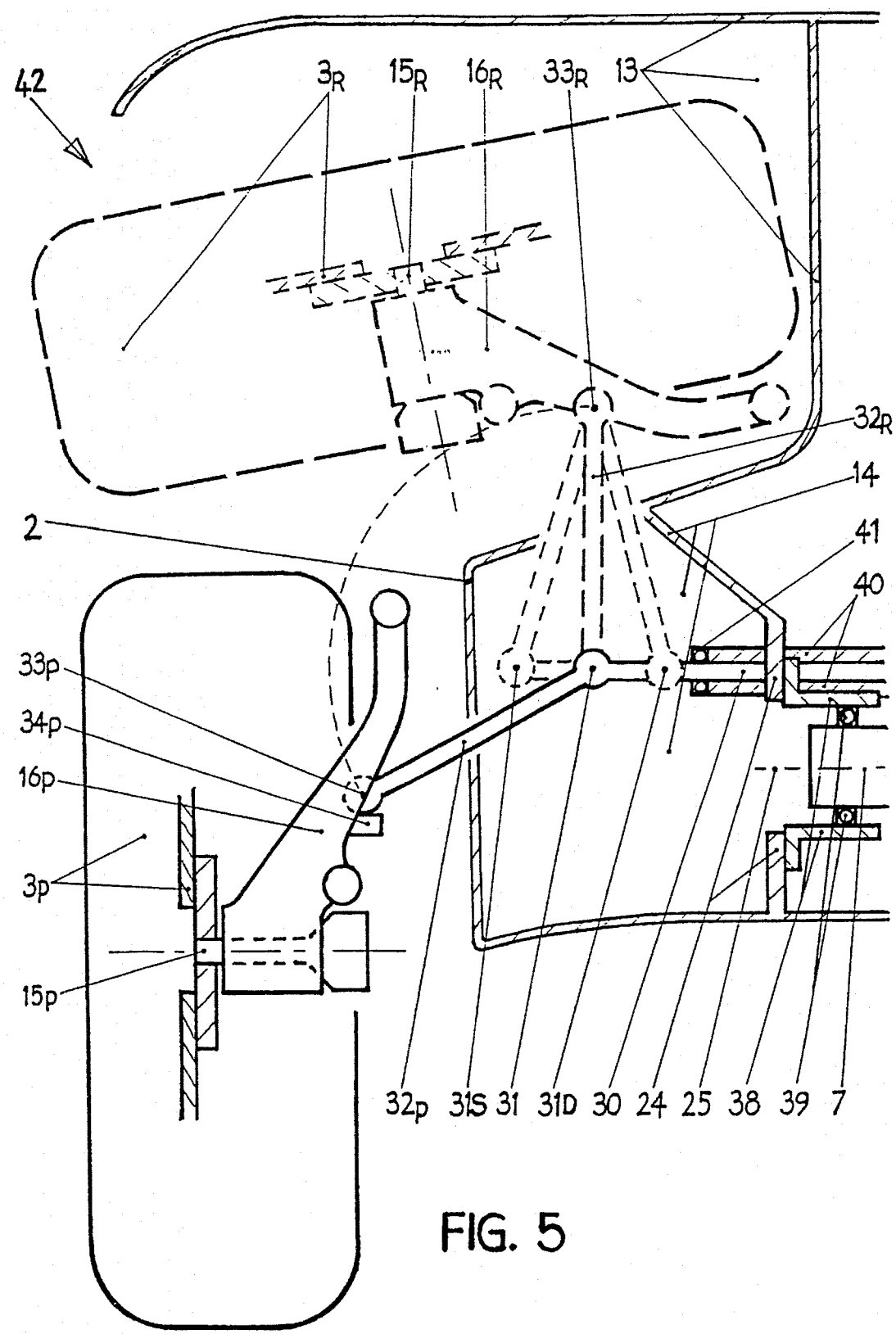
FIG. 5 is an end-elevational diagram of the apparatus of FIG. 3 shown in both the protracted position and the retracted position.

FIG. 5 gives a more detailed elevational view of the apparatus 42, with particular reference to the geometric arrangement of the steering connections during the retracting process. A profile of the wheel 3 is shown mounted on the spindle 15, while the drive-axle 10 and the suspension linkages 11 and 12 have been deleted for clarity. Steering component numbers are suffixed D when steering is to the right, and S when steering is to the left.

With the apparatus 42 in the protracted position: reciprocating motion of the steering shaft 30 causes pivot 31 to reciprocate from 31S to 31D and this motion is transmitted through the steering-link 32P and the steering-arm 34P to the wheel-support member 16P.

In the course of the retracting process: the pivot 33P describes an arc to 33R, whereby the steering-link 32P articulates to 32R about the pivot 31.

With the apparatus 42 in the retracted position: when the pivot 31 reciprocates from 31S to 31D, the steering-link 32R is caused to articulate about the pivot 33R. (A slight vertical displacement of the pivot 33R will be negligible in practice).

It will be seen that this arrangement permits the vehicular steering to remain connected while the wheels are retracted for the water-borne mode. The steering-shaft may also control the marine-propulsion steering, which can be operative in the land-support mode without effect: it is therefore unnecessary to disable the steering for either mode.

FIG. 5 also shows, in profile, a representation of the upper compartment 13 which largely encloses the wheel 3R in the retracted position.

FIG. 5 also shows the lower compartment 14 having a closed inboard end formed by the bulkhead 24 which contains the portal 25, being an opening for the drive-axle 10. In this example, a flanged housing 38 contains a sealing-device 39, which prevents fluids from passing through the portal 25 to the interior of the vehicle 1. In this case a rotary seal which bears upon the outer surface of the drive output 7 is shown, but a variety of sealing-devices could be employed for this purpose.

FIG. 5 also shows the steering-shaft 30 enclosed by a cylindrical guide-housing 40 which is fixed in the bulkhead 24. A sealing-device 41 exemplifies various means whereby fluids may be prevented from passing between the shaft 30 and the housing 40.

It is thought that the wheel retraction apparatus and method of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What we claim is:

1. An apparatus for retracting an axle-driven wheel onboard an amphibious vehicle, said apparatus comprising:

(a) drive means for driveably and pivotally connecting a drive-output to said wheel while allowing said wheel to follow a retracting process, from a protracted position wherein said wheel has an axis of rotation substantially horizontal and said wheel is able to provide land-support to said vehicle, to a retracted position wherein said wheel has said axis at an angle greater than 45 degrees to said horizontal and said wheel is elevated substantially above the waterline of said vehicle when afloat; and (b) location means for locating said wheel to the body of said vehicle, said location means providing a geometric arrangement whereby said wheel may follow said retracting process while remaining connected to said drive-means.

2. An apparatus for retracting an axle-driven wheel onboard an amphibious vehicle as recited in claim 1, wherein said drive means comprises;

(a) a drive-axle, being driveably and pivotally connected at a proximate end thereof to said drive-output; and (b) a spindle, being driveably and pivotally connected at a proximate end thereof to a distal end of said drive-axle; and wherein said wheel is driveably attached to a distal end of said spindle, whereby said drive-means are able to rotate cooperatively and whereby said wheel may follow said retracting process.

3. An apparatus for retracting an axle-driven wheel on board an amphibious vehicle as recited in claim 2, wherein said location means comprises;

(a) a wheel-support member having an upper end and a lower end, with said spindle and said wheel being rotatably mounted at said lower end;

(b) an upper suspension linkage being pivotally attached at a proximate end thereof to said vehicle body, and pivotally attached at a distal end thereof to said upper end of said wheel-support member; and (c) a lower suspension linkage being pivotally attached at a proximate end thereof to said vehicle body, and pivotally attached at a distal end thereof to said lower end of said wheel-support member; wherein said upper suspension linkage and said lower suspension linkage provide a geometric arrangement whereby said wheel-support member may follow said retracting process while remaining connected to said drive-means.

4. An apparatus for retracting an axle-driven wheel on board an amphibious vehicle as recited in claim 3, further comprising vehicular steering means, comprising:

(a) steering connections, including a steering shaft, a steering link and a steering arm attached to said wheel-support member; and (b) steering pivots for pivotally mounting said wheel-support member, whereby said wheel-support member may be turned on a substantially vertical axis so as to provide said vehicular steering when controlled by said steering connections; said steering connections being geometrically arranged so as to allow said retracting process while remaining connected to said wheel-support member; and said steering connections being geometrically arranged so that said vehicular steering is substantially cancelled when said wheel is in said retracted position.

5. An apparatus for retracting an axle-driven wheel on board an amphibious vehicle as recited in claim 4, further comprising means for enclosing and supporting said apparatus, comprising:

(a) a lower compartment having a closed inboard end and an open outboard end, said lower compartment being integral with said vehicle body, and arranged so as to pivotally support said proximate end of said lower suspension linkage, and to partially enclose said lower suspension linkage and said drive-axle; said lower compartment having a portal, being an opening by which said drive-axle may pass through said closed inboard end of said lower compartment, and sealing means, whereby fluids may be prevented from passing through said portal; and (b) an upper compartment having a closed inboard end and an open outboard end, said upper compartment being integral with said vehicle body and arranged so as to pivotally support said proximate end of said upper suspension linkage, and to partially enclose said wheel when said wheel is in said retracted position.

6. An apparatus for retracting an axle-driven wheel on board an amphibious vehicle as recited in claim 5, further comprising means for actuating said retracting process comprising:

(a) a torsion-bar for applying actuating motion to said location-means in order to actuate said retracting process, and wherein said torsion-bar also provides suspensional support to said vehicle; and (b) a power-means for applying torque to said torsion-bar in order to actuate said retracting process, whereby said power-means also provides suspensional support to said vehicle.

7. A method of retracting an axle-driven wheel onboard an amphibious vehicle comprising the steps of:

(a) driveably and pivotally connecting a drive-axle to said wheel while allowing said wheel to follow a retracting process, from a protracted position wherein said wheel has an axis of rotation substantially horizontal and said wheel is able to provide land support to said vehicle, to a retracted position wherein said wheel has said axis at an angle greater than 45 degrees to said horizontal and said wheel is elevated substantially above the waterline of said vehicle when afloat; and (b) locating said wheel to the body of said vehicle whereby said wheel may follow said retracting process while remaining connected to said drive-axle.

8. A method of retracting an axle-driven wheel onboard an amphibious vehicle as recited in claim 7, wherein driving said wheel includes the step of:

driveably and pivotally connecting a drive-output through said drive-axle to said wheel whereby said drive-output, said drive-axle and said wheel may rotate co-operatively, and wherein said wheel may perform said retracting process.

9. A method of retracting an axle-driven wheel onboard an amphibious vehicle as recited in claim 8, wherein locating said wheel retractably to said vehicle body includes the steps of:

(a) mounting said wheel rotatably upon a wheel-support member;

(b) providing location-means for pivotally locating said wheel-support member to said vehicle body; and (c) geometrically arranging said location-means and said wheel-support member whereby said wheel may follow said retracting process while remaining driveably connected to said drive-output.

10. A method of retracting an axle-driven wheel onboard an amphibious vehicle as recited in claim 9, wherein turning of said wheel to provide vehicular steering includes the steps of:

(a) mounting said wheel whereby said wheel maybe turned in such a way as to provide said vehicular steering;

(b) arranging steering connections whereby said wheel may be controlled in order to provide said vehicular steering, and wherein said wheel may follow said retracting process; and (c) arranging said steering connections whereby said vehicular steering will be substantially cancelled when said wheel is in said retracted position.

11. A method of retracting an axle-driven wheel onboard an amphibious vehicle as recited in claim 10, further comprising an enclosing and supporting procedure including the steps of:

(a) partly enclosing said location-means and said drive-axle within a lower compartment wherein said location-means is partly supported by said lower compartment;

(b) providing drive-axle sealing means within said lower compartment whereby fluid may be prevented from entering the interior of said vehicle; and (c) partly supporting said location-means by an upper compartment, and partially enclosing said wheel within said upper compartment when said wheel is in said retracted position.

12. A method of retracting an axle-driven wheel onboard an amphibious vehicle as recited in claim 11, further comprising an actuating procedure comprising the step of:

applying a power-means to said location-means whereby said power-means may actuate said retracting process and whereby said power-means may also provide suspensional support to said vehicle.

* * * * *